US007711191B2

(12) United States Patent
Kosek et al.

(10) Patent No.: US 7,711,191 B2
(45) Date of Patent: May 4, 2010

(54) ELECTRONIC TRANSACTION PROCESSING SERVER WITH AUTOMATED TRANSACTION EVALUATION

(76) Inventors: Michael John Kosek, 9 Edinburgh Rd., Windham, NH (US) 03087; Soteris Vasili, 43 Widford Road, Hunsdon Near Ware (GB) SG1 28NN ( * ) Notice: Subject to any disclaimer, the term of this patent is extended or adjusted under 35 U.S.C. 154(b) by 803 days.

(21) Appl. No.: 11/643,353

(22) Filed: Dec. 21, 2006

(65) Prior Publication Data

US 2008/0152209 A1 Jun. 26, 2008

(51) Int. Cl.
*G06K 9/00* (2006.01)
*G06F 17/00* (2006.01)
*H04N 1/23* (2006.01)

(52) U.S. Cl. .................. 382/181; 382/101; 382/137; 382/321; 358/296; 715/200

(58) Field of Classification Search ......... 382/101–102, 382/135–140, 181–189, 199–200, 312, 317, 382/321–325; 358/401, 403, 462, 296, 302; 715/200, 209, 221–226, 234–236, 256, 271, 715/277
See application file for complete search history.

(56) References Cited

U.S. PATENT DOCUMENTS

| | | | | | |
|---|---|---|---|---|---|
| 3,999,161 | A | * | 12/1976 | van Bilzem et al. | 382/203 |
| 4,264,808 | A | * | 4/1981 | Owens et al. | 705/30 |
| 4,415,880 | A | * | 11/1983 | Scott | 382/205 |
| 4,504,972 | A | * | 3/1985 | Scherl et al. | 382/171 |
| 4,802,231 | A | * | 1/1989 | Davis | 382/219 |
| 4,933,984 | A | * | 6/1990 | Nakano et al. | 382/175 |
| 5,060,980 | A | * | 10/1991 | Johnson et al. | 283/70 |
| 5,097,517 | A | * | 3/1992 | Holt | 382/137 |
| 5,119,433 | A | * | 6/1992 | Will | 382/138 |
| 5,134,669 | A | * | 7/1992 | Keogh et al. | 382/318 |
| 5,140,650 | A | * | 8/1992 | Casey et al. | 382/283 |
| 5,251,273 | A | * | 10/1993 | Betts et al. | 382/311 |
| 5,305,396 | A | * | 4/1994 | Betts et al. | 382/175 |

(Continued)

*Primary Examiner*—Manav Seth
(74) *Attorney, Agent, or Firm*—Timothy P. O Hagan

(57) ABSTRACT

An invoice processing system generates a data structure, comprising a data field value associated with each of a plurality of identified data fields, from a document image comprising text representing each of such data field values. The secure document data capture system includes a character recognition system receiving the document image and recognizing characters within the text to generate, for each of the identified data fields, a data field value for association therewith. A validation engine identifies a subset of the identified data fields which can be referred to as exception data fields due to failure to comply with a validation rule. An exception handling system provides an exception image to a first client system. The exception image comprising a portion of the document image which includes text of the at least one suspect character within the exception data field with a context portion of the document image redacted. The context portion of the document image is a portion of the document image which comprises text which discloses a meaning of the at least one suspect character or the data field value. The exception handling system receives, from the first client system, user input of a replacement character for at least each suspect character. The secure data capture system then generates the data structure utilizing, for each identified data field, the data field values generated by the character recognition system with substitution of the replacement character from the exception handling system for each suspect character.

9 Claims, 7 Drawing Sheets

U.S. PATENT DOCUMENTS

| | | | |
|---|---|---|---|
| 5,359,667 A * | 10/1994 | Borowski et al. | 382/138 |
| 5,369,508 A * | 11/1994 | Lech et al. | 358/462 |
| 5,428,694 A * | 6/1995 | Betts et al. | 382/317 |
| 5,530,907 A * | 6/1996 | Pavey et al. | 710/69 |
| 5,734,723 A * | 3/1998 | Windel et al. | 380/55 |
| 5,765,179 A * | 6/1998 | Sumita et al. | 715/236 |
| 5,850,480 A * | 12/1998 | Scanlon | 382/229 |
| 5,852,676 A * | 12/1998 | Lazar | 382/173 |
| 5,857,034 A * | 1/1999 | Tsuchiya et al. | 382/175 |
| 6,028,970 A * | 2/2000 | DiPiazza et al. | 382/309 |
| 6,055,327 A * | 4/2000 | Aragon | 382/138 |
| 6,279,018 B1 * | 8/2001 | Kudrolli et al. | 715/234 |
| 6,694,459 B1 * | 2/2004 | Nyman | 714/718 |
| 6,782,144 B2 * | 8/2004 | Bellavita et al. | 382/310 |
| 6,782,510 B1 * | 8/2004 | Gross et al. | 715/257 |
| 6,798,896 B2 * | 9/2004 | Watanabe et al. | 382/101 |
| 7,079,712 B1 * | 7/2006 | Silverbrook et al. | 382/312 |
| 7,289,685 B1 * | 10/2007 | Wolff et al. | 382/317 |
| 2002/0103834 A1 * | 8/2002 | Thompson et al. | 707/526 |
| 2002/0141660 A1 * | 10/2002 | Bellavita et al. | 382/309 |
| 2002/0198935 A1 * | 12/2002 | Crandall et al. | 709/203 |
| 2004/0199863 A1 * | 10/2004 | Hitchcock et al. | 715/500 |
| 2005/0018896 A1 * | 1/2005 | Heit et al. | 382/137 |
| 2005/0281450 A1 * | 12/2005 | Richardson | 382/139 |
| 2006/0147117 A1 * | 7/2006 | Wakeam et al. | 382/186 |
| 2008/0267505 A1 * | 10/2008 | Dabet et al. | 382/181 |

* cited by examiner

| ASCII | 96 | X 98 | Y 100 |
|---|---|---|---|
| Invoice: | | 1 | 6.25 |
| 0534 | | 2.25 | 6.25 |
| Date: | | 3.75 | 6.25 |
| 01/01/06 | | 4.25 | 6.25 |
| PO: | | 5.75 | 6.25 |
| 15742 | | 2.25 | 9.75 |
| | | | |
| | | | |
| | | | |
| | | | |
| | | | |
| | | | |
| | | | |

ELECTRONIC TRANSACTION PROCESSING SERVER WITH AUTOMATED TRANSACTION EVALUATION

TECHNICAL FIELD

The present invention relates to document data capture systems, and more particularly, to a document data capture system which includes character recognition of text data and provides for exception handling of exception data field values and/or suspect characters in a secure manner.

BACKGROUND OF THE INVENTION

Data capture systems which utilize character recognition to facilitate capturing of data from text based documents have existed for many years. In more sophisticated systems, characters recognized from a document image may be populated into fields of a database or fields of a data file.

On challenge with such data capture systems is that character recognition technology remains prone to error. The errors are further exacerbated if the document image on which the character recognition is based is an image generated by scanning of a paper document which includes any of low contrast, ink bleed, or other characteristics which affect the shape, alignment, and/or spacing of characters as present in the document image.

Contemporary data capture systems which are used for generating data fields with specific data elements may employ exception handling to correct errors within character recognition processes. In more detail, the data capture system initially identifies each data field value using characters provided by the character recognition system. Validation rules are then applied to the data field values to identify characters that may have been mis-recognized by the character recognition system. For example, if the data field value is expected to be a numerical value, a validation rule may consist of verifying that the data field value is numerical. A roman alphabet character within the data field value would be character likely mis-recognized.

Exception handling systems provide for display of the document image on a monitor for a human recognition and keyboard input of those characters that are likely mis-recognized. To facilitate the human operations, more sophisticated exception handling systems may sequentially highlight the mis-recognized characters within the document for human recognition and keyboard input.

After the exception characters are returned, the data capture system may substitute the human recognized characters for the characters mis-recognized by the character recognition system.

To further improve accuracy, the exception handling systems may provide for display of the same document image on a monitor of a second and independent exception handling processor for a second and independent input of those characters that are likely mis-recognized.

A problem with existing document capture systems that use existing exception handling techniques is that if the application is such that the document image includes confidential information, extensive security measures must be implement to adequately protect the confidential information when transmitted to the exception handling processor and displayed for exception handling.

Examples of confidential information within a document image include social security or tax numbers, credit card account numbers, bank account numbers, financial information, protected health information, or other identifiable confidential information. If such information is included, the hardware, software, and network systems used for providing the document image to the human operators must be secured.

The facilities at which human operators have access to the monitors displaying the document images must be secured. The human operators must be bound by, and trained to comply with, appropriate policies and procedures related to such confidential information. And, extensive resources are typically utilized to monitor and audit the security of the systems, policies, and procedures to achieve confidence that the confidential information remains protected.

What is needed is a secure document data capture system which provides the accuracy of a system that includes exception handling in a manner wherein the confidential information is secured in a manner that does not require the extensive resources needed for implementing the systems, policies and procedures to secure confidential information when traditional exception handling systems are employed.

SUMMARY OF THE INVENTION

A first aspect of the present invention comprises a system for secure document data capture. The system generates a data structure, comprising a data field value associated with each of a plurality of identified data fields, from a document image comprising text representing each of such data field values. The identified data fields may be fields within a relational database, fields within an XML file, or fields within a character delimited file.

The secure document data capture system includes a character recognition system receiving the document image and recognizing characters within the text to generate, for each of the identified data fields, a data field value for association therewith.

A validation engine identifies a subset of the identified data fields which can be referred to as exception data fields. The subset of the identified data fields may be those data fields with which its associated data field value includes at least one suspect character. A suspect character may be a character which fails to comply with a validation rule (or causes the data field value to fail to comply with a validation rule) thereby indicating that that character recognition system erred in recognizing such character(s).

An exception handling system provides an exception image to a first client system. The exception image comprising a portion of the document image which includes text of the at least one suspect character with a context portion of the document image redacted. The context portion of the document image is a portion of the document image which comprises text which discloses a meaning of the at least one suspect character or the data field value.

Stated another way, the exception handling system may distinguishing an exception portion, of the document image from a redacted portion of the document image. The exception image comprises the exception portion to the exclusion of the redacted portion. Each exception portion may form it sown exception image such that multiple exception images are generated form a single document image.

The exception handling system receives, from the first client system, user input of a replacement character for at least each suspect character.

The secure data capture system then generates the data structure utilizing, for each identified data field, the data field values generated by the character recognition system with substitution of the replacement character from the exception handling system for each suspect character.

To further improve accuracy, the exception handling system may further: i) provide the exception image to a second client system; and ii) receive from the second client system, user input of a replacement character for each suspect character.

The secure data capture system substitutes the replacement character from the exception handling system for each suspect character only when the replacement character form the first client system and the replacement character from the second client system are the same.

For a better understanding of the present invention, together with other and further aspects thereof, reference is made to the following description, taken in conjunction with the accompanying drawings. The scope of the invention is set forth in the appended claims.

BRIEF DESCRIPTION OF THE DRAWINGS

FIG. 2 is a diagram representing a document image in accordance with one embodiment of the present invention;

FIG. 3 is a table representing association of recognized characters with position within a document image in accordance with one embodiment of the present invention;

DETAILED DESCRIPTION OF THE INVENTION

Figure 1:
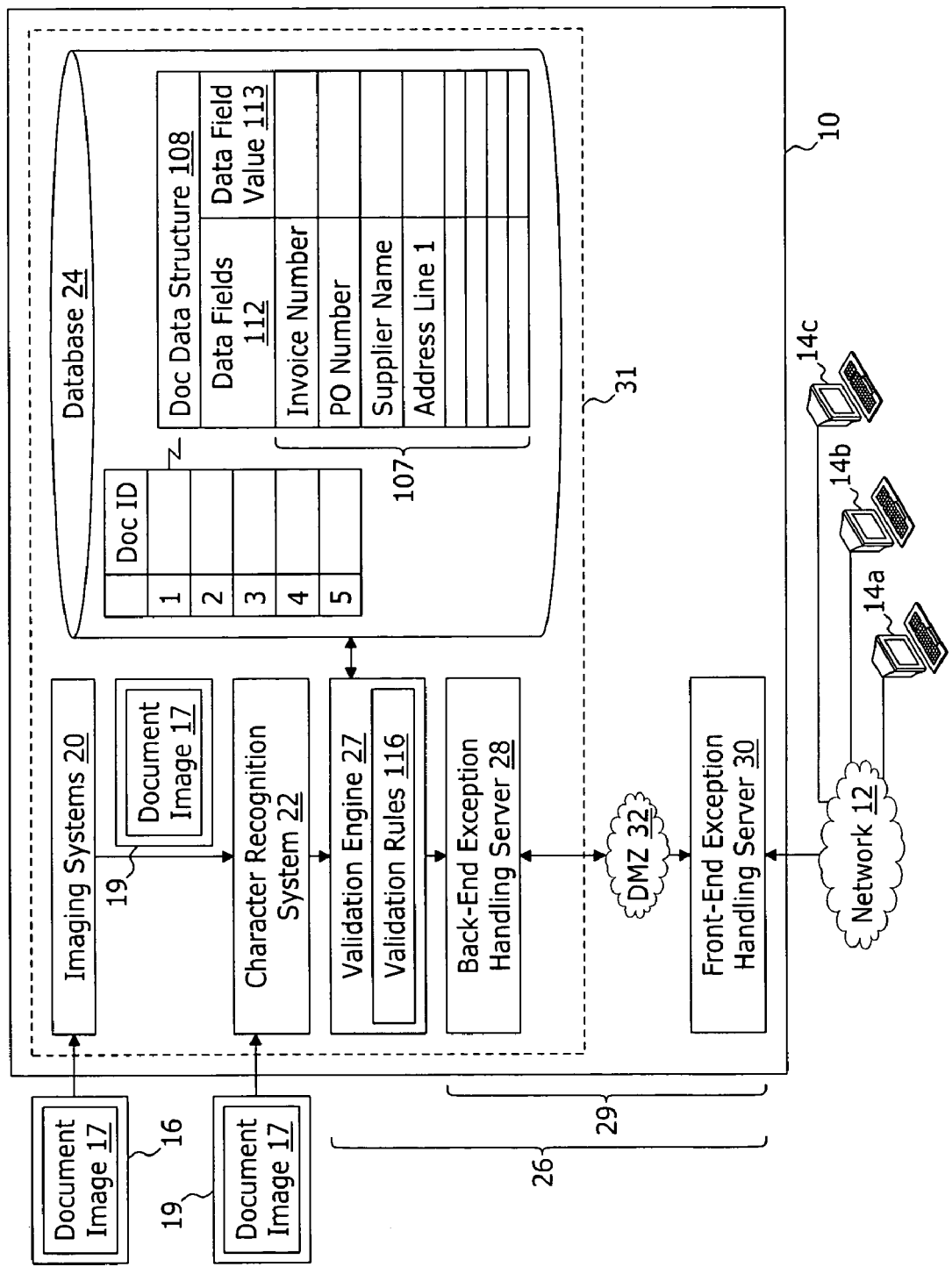
FIG. 1 is a block diagram of a secure document data capture system in accordance with one embodiment of the present invention.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in hardware circuit(s), a processor executing software code, or a combination of a hardware circuit and a processor executing code. As such, the term circuit as used throughout this specification is intended to encompass a hardware circuit (whether discrete elements or an integrated circuit block), a processor executing code, or a combination of a hardware circuit and a processor executing code, or other combinations of the above known to those skilled in the art.

FIG. 1 Overview

FIG. 1 illustrates exemplary architecture of a secure document data capture system 10 in accordance with one embodiment of the present invention. The system 10 may comprise one or more imaging systems 20, a character recognition system 22, and a validation system 26.

The validation system may include a validation engine 27 and an exception handling system 29. The exception handling system 29 may comprises a back end exception handling server 28 and a front end exception handling server 30.

Each of the one or more imaging systems 20, the character recognition system 22, the database 24, the validation engine 27 and the back end exception handling server 28 may be within a secure environment 31.

Although FIG. 1 represents the secure environment 31 as a single dashed box encompassing each of such elements, it should be appreciated that the secure environment 31 may encompass multiple secure image capture centers and/or secure data centers (each with independent physical and electronic security systems) at multiple geographic locations wherein communications there between is performed in secure manner, including encrypted data transfers over public network.

The front end exception handling server 30 may be communicatively connected to the back end exception handling server 28 via a semi-secure network typically called a perimeter network or a DMZ network 32. Such structure enables the front end exception handling server 30 to be coupled to a non-secure network 12 (such as the public internet 12) and to operate as a web server exchanging data with multiple exception handling clients 14a-14c over such non-secure network 12 while protecting the back end exception handling server 28 from common security attacks.

Imaging Systems

Each of the one or more imaging systems 20 may comprise one or more devices commonly referred to as "Scanners" which capture a document image 17 embodied in a paper document 16 and generate a document image 17 embodied as image file 19 in any of a plurality of image file formats such as PDF, TIF, TIFF, or known image file formats.

In the exemplary embodiment, paper documents 16 of a particular document type (such as invoices for a particular user) are received at a post box designated to receive such type of documents. This enables batch imaging of all of a particular type of document without having to perform manual sorting at the scanning facility.

After image capture, the imaging system provides the document image 17, as an image file 19, to the character recognition system 22.

Character Recognition System

The character recognition system 22 receives each document image 17 as an image file 19. The document image may be from the one or more imaging systems 20 or, in an environment wherein image files 19 are provided by an independent source (such as a file feed from a user), document images 17 may be from such independent source.

In general, each document image 17 will include text (alpha numeric or graphic) representing data field values 113 for each of a plurality of identified data fields 112 of a identified data structure 108. In the exemplary embodiment, the identified data structure 107 may be embodied in tables of a database 24 within the secure environment 31. However, it is also envisioned that the identified data structure may be a defined file format such as a particular XML schema or a character delimited file with predefined data fields.

For example, referring to FIG. 2 in conjunction with FIG. 1, an exemplary document image 17 may include text representing an invoice and, in more detail may comprise data field values such as: i) "0534" (reference numeral 70); ii) "17542" (reference numeral 78); iii) "Supplier Inc. (reference numeral 65); and iv) "12345 Street Name" (reference numeral 67) which respectively correspond to identified data fields 112 identified as: i) Invoice Number; ii) PO Number; iii) Supplier Name; and iv) Address Line 1.

The character recognition system 22 recognizes, for each of the identified data fields 112, a data field value 113 within the document image 17 for association therewith.

To perform this process, the character recognition system 22 identifies, for each of the identified data fields 112: i) a set of one or more characters (e.g. ASCII characters) recognized within the document image 17 which correspond to field marker characters associated with the identified data field; and ii) a set of one or more characters (e.g. ASCII characters) recognized in the document image 17 which represents a data field value to associate with the identified data field by its proximity to the field marker characters.

In more detail, the character recognition system 22 may recognition each character of text within the document image 17 and associate each recognized character, or group of characters, with a position within the image.

Referring briefly to the table of FIG. 3 in conjunction with FIG. 2, an ASCII value 96 for each recognized character (or the ASCII values for a group of characters recognized) may be associated with a coordinate value 98/100 (within an X/Y Cartesian coordinate system 73 overlaid over the image) of the characters location within the document image 17.

For example, the word "Invoice:" 68 appears within the document image 17 at a certain coordinate (approximately 1, 6.25 in this example). The character recognition system 22 associates the ASCII values for the characters of "Invoice" with the coordinates.

Characters "0534" (reference numeral 70) appear within the image at a certain coordinate (approximately 2.25, 6.25 in this example).

The word "Date:" 72 appears at certain coordinates (approximately 3.75, 6.25 in this example). The character recognition system associates the ASCII values for the characters of "Invoice" with the coordinates.

Characters "01/15/06" 74 appear within the image at certain coordinates (approximately 4.25, 6.25 in this example. The character recognition system associates the ASCII values for the characters of "Invoice" with the coordinates.

The characters "PO:" 76 appear at certain coordinates (approximately 5.75, 6.25 in this example). The character recognition system associates the ASCII values for the characters of "Invoice" with the coordinates.

The characters "15742" 78 appear at certain coordinates (approximately 2.25, 9.75 in this example). The character recognition system associates the ASCII values for the characters of "Invoice" with the coordinates.

Returning to FIG. 1 in conjunction with FIG. 2, after recognizing characters, the character recognition system 22

Figures 4, 5:
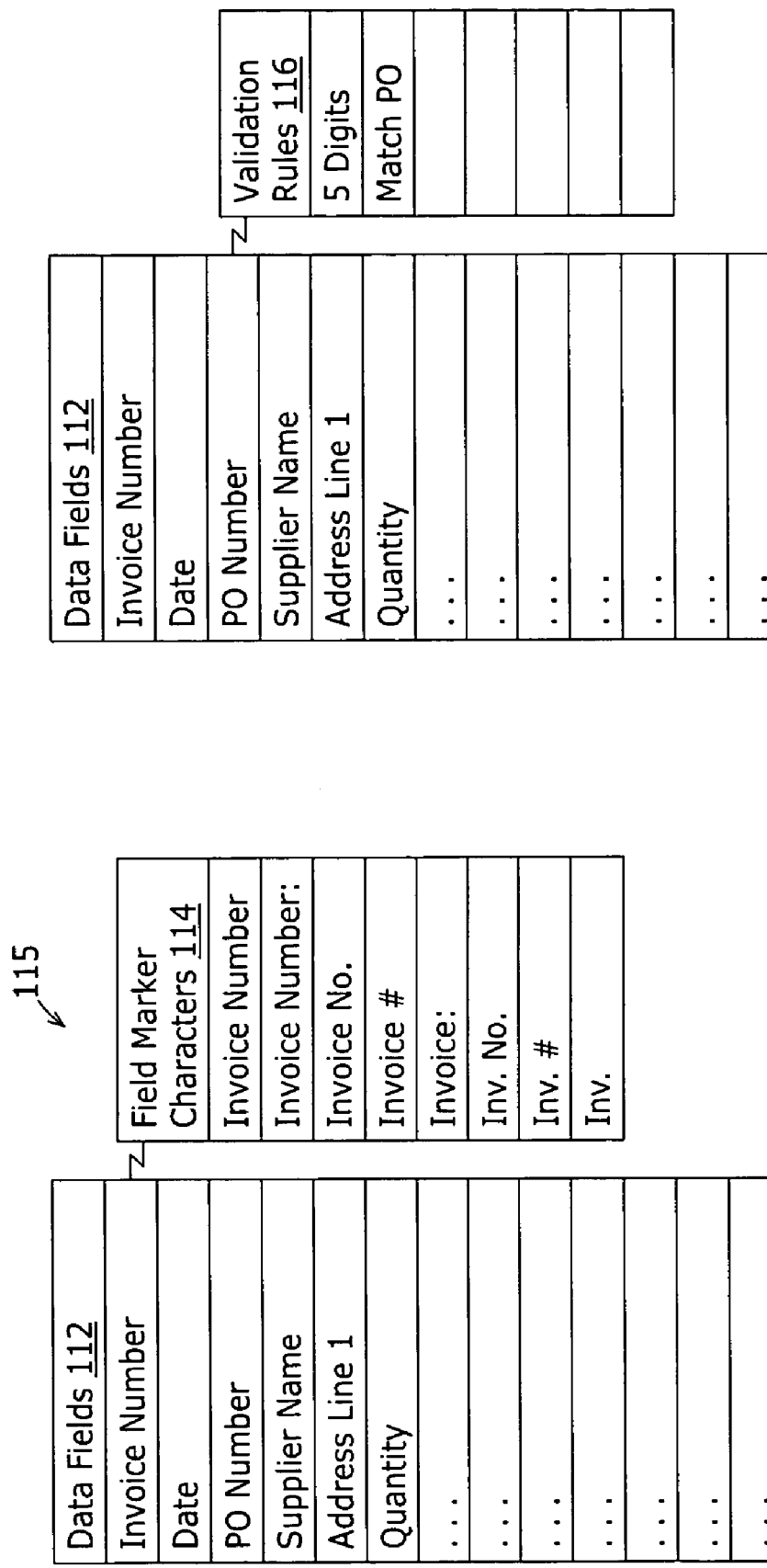
FIG. 4 is a database representing exemplary field marker characters in accordance with one embodiment of the present invention.
FIG. 5 is a database representing exemplary validation rules in accordance with one embodiment of the present invention.

With brief reference to FIG. 4 in conjunction with FIG. 1 and FIG. 3, the character recognition system may generates a data field value 113 for each of the identified data fields 112 of the identified data structure 108 by use of a field marker database 115 which associates, for each of the identified data fields 112, the various field marker characters 114 with may be used to identify the data field value within the document image 17.

For example, the identified data field 112 labeled "Invoice Number" is associated with the following field marker characters 114 "Invoice Number", "Invoice Number:", "Invoice No.", "Invoice #", "Invoice:", "Inv. No.", "Inv. #", and "Inv:".

The character recognition system 22 identifies any of such associated field marker characters 114 that are within the document image 17. The character recognition system 22 then identifies the data field value 113 to associate with the identified data field 112 labeled "Invoice Number" identifying the character set located within a field value location. The field value location may be a predetermined displacement from the field marker characters 114. The predetermined displacement is generally a displacement to the right of the field marker characters 114 or below the field marker characters 114.

In the example invoice image shown in FIG. 2, the character string "Invoice:" (reference numeral 68) corresponds to one of the field marker characters 114 associated with the identified data field 112 labeled "Invoice Number" and is located at coordinates of approximately 1, 6.25. The character recognition system recognizes an ASCII value located to the right of, or below the coordinate 1, 6.25 as the field value 113 to associate with the identified data field 113 labeled "Invoice Number" in the identified data structure 108. In this example, that is the ASCII character set "0534" (reference numeral 70).

Further, if a value type associated with the identified data field 112 indicates that the value should be numerical rather than ASCII, the character recognition system 22 may convert the ASCII value to a numerical value before associating such value with the identified data field 112 as its associated data field value 113.

This process is repeated for all identified data fields 112 of the invoice structure 108. And, after data field values 113 are associated with the identified data fields 112, the data field values are stored within a database (within a table structure or as a file) or passing directly to the validation engine 27.

Validation System

Returning to FIG. 1, because electronic character recognition systems have inherent inaccuracies, the character validation system 26 is used to increase the accuracy of the data field value 112 associated with each identified data field 113.

As discussed, the character validation system 26 may comprise a validation engine 27 and an exception handling system 29. In general, the validation engine detects data field values which fail to comply with one of a plurality of validation rules 116 indicating that the character recognition system likely erred in recognizing one or more characters comprising such data field value. The one or more characters may be referred to as suspect characters or the data field value as an exception data field value.

The exception handling engine provides an exception image (which is the portion of the image document 17 comprising the one or more suspect characters with context portions of the document image that disclose the meaning of the data field value redacted) to at least one of the exception handling clients 14a-14c wherein a human operator recognizes and manually inputs characters for replacement of the suspect characters as the data field value.

In more detail, the validation engine 27, for each of the identified data fields 112: i) receives the data field value 113 associated therewith by the character recognition system 22; and ii) applies at least one validation rule 116 to distinguish between valid data field values and exception data field values. Again, a valid data field value is a value which complies with the at least one validation rule 116. An exception data field value is a value which fails to comply with the validation rule and is an indication that the data field value includes one or more suspect characters and that the character recognition system erred in recognizing such characters.

It should also be appreciated that the character recognition system 22 may include processes for providing a default, null, or other values as part of a data field value if the character recognition system 22 is unable to recognize a character, the occurrence of such default, null, or other value within the data field value may also be as an exception data field value and an indication that the character recognition system erred in recognizing at least one character of such value.

Turning briefly to FIG. 5, exemplary validation rules 116 are shown. The database associates at least one validation rule 116 to each of the identified data fields 112. For example, a validation rule 116 for applying to a identified data field 112 labeled "PO Number" may be a rule that requires the value to be 5 digits. Therefore a value other than 5 digits would an exception data field value.

As another example, a validation rule 116 for applying to the identified data field 112 labeled "PO number" may be a rule that requires matching of the value to a listing of valid PO numbers (as obtained from the a user for which the invoices are being received). Therefore a value other than a value that matches a valid PO number would an exception data field value.

As yet another examples, a validation rule for a identified data field representing a supplier or vendor name may be that matches the name of a supplier or vendor existing in a database. A similar rule may apply to a identified data field representing the supplier address.

Figure 6:
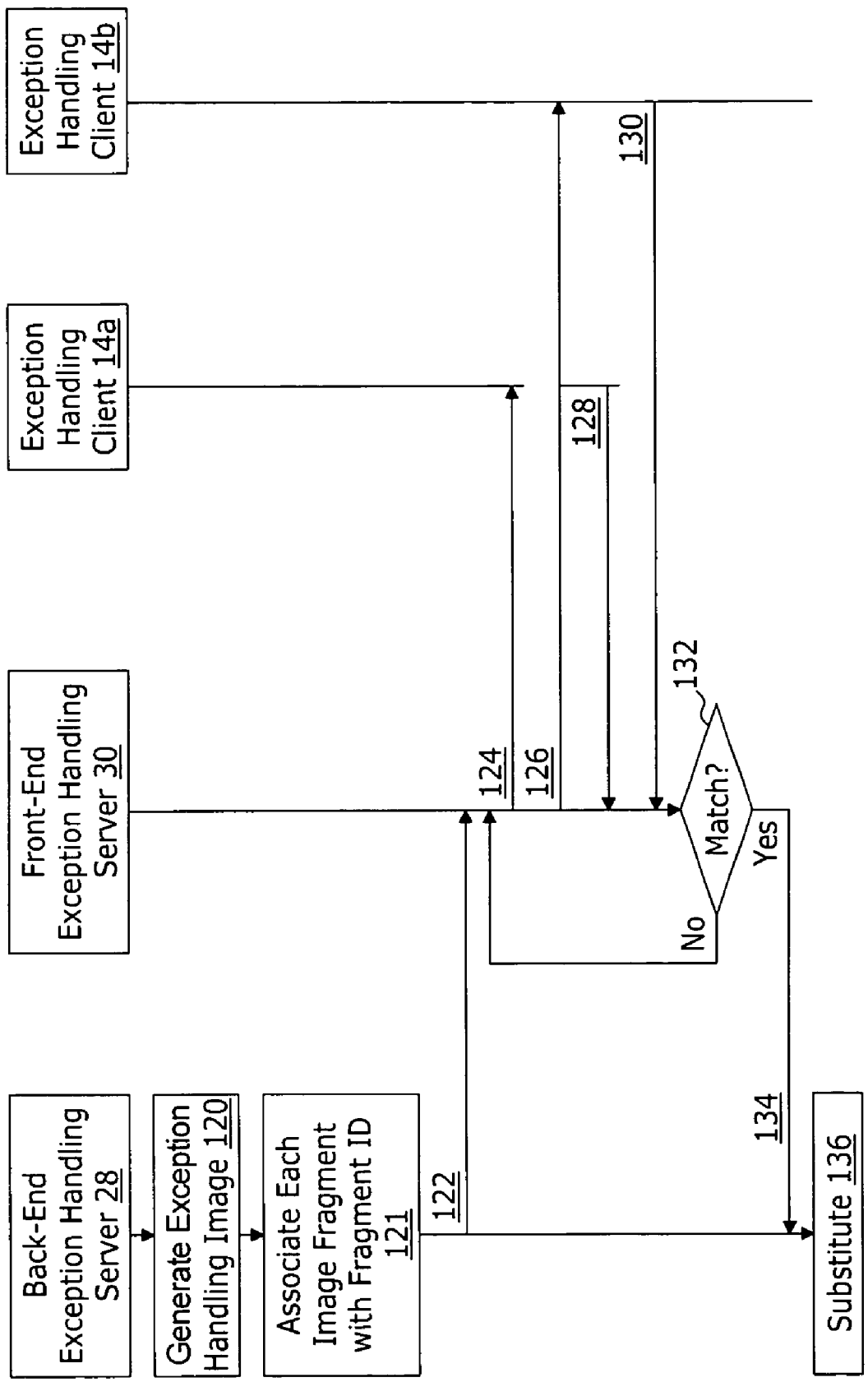
FIG. 6 is a ladder diagram representing exemplary exception handling in accordance with one embodiment of the present invention.

Turning to FIG. 6, exemplary operation is shown for interaction of the back end exception handling server 28, the front end exception handling server 30, and the exception handling clients 14a and 14b for: i) providing an exception image to at least one of the exception handling clients 14a-14c; and ii) obtaining a replacement value input by a human operator for replacement of the suspect characters as the data field value.

Step 120 represents the back end exception handling server 28 generating one or more exception handling images 38.

Figure 7:
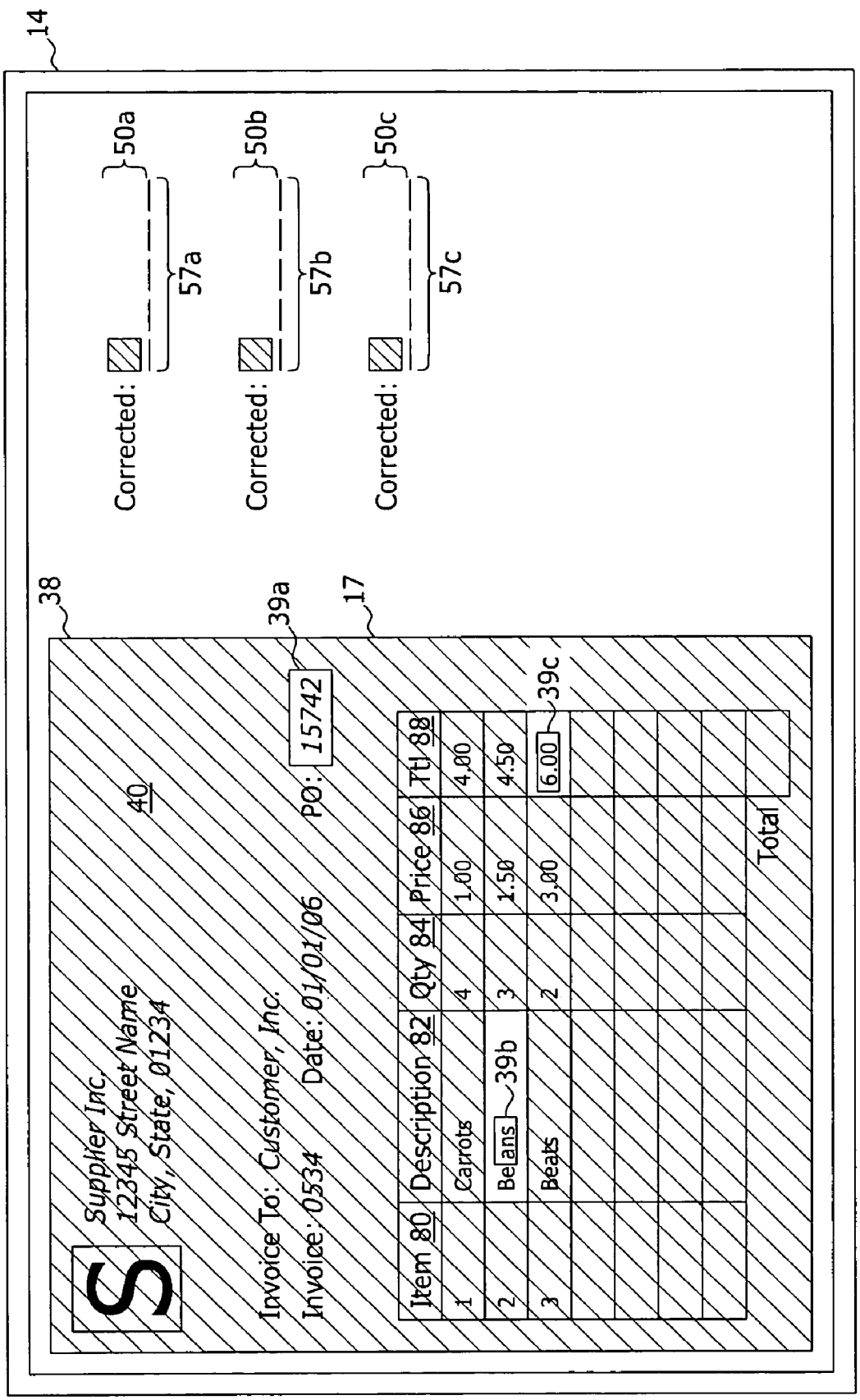
FIG. 7 is a diagram representing a first sub-embodiment of exception handling in accordance with the present invention.

Turning briefly to FIG. 7, a first embodiment of operation wherein the back end exception handling server 28 generates a single exception handling image 38 representing multiple exception data field values is shown.

The exception handling image 38 is generated by distinguishing exception portions 39a-39c of the document image 17 from a redacted portion 40 (shown under the hashing) of the document image 17. The exception portions 39a-39c of the document image 17 are those portions of the document image which including the text of the at least one suspect character. The redacted portion 40 of the document image 17 is a portion of the document image which comprises text which discloses the meaning of the data field value of any of the data field values represented by the exception portions 39a-39c. The exception portions 39a-39c may be determined by selection of a very small predefined area surrounding the suspect characters and/or an area surrounding the suspect characters that is devoid of other characters.

The exception handling image includes the exception portions 39a-39c as visible portions of the exception image 38 while the redacted portions 40 are fully redacted. Redacted means no text within such portions is visible when displayed or otherwise recoverable from the exception image file—all image data within the redacted portion may be replaced With a null background or other null image. It should be appreciated that for security, image data of the redacted portions 40 (e.g. data this is visible under the hashing in FIG. 7) is fully redacted for creation of the exception handling image 38 such that it never passes outside of the secure environment 31.

Figure 8:
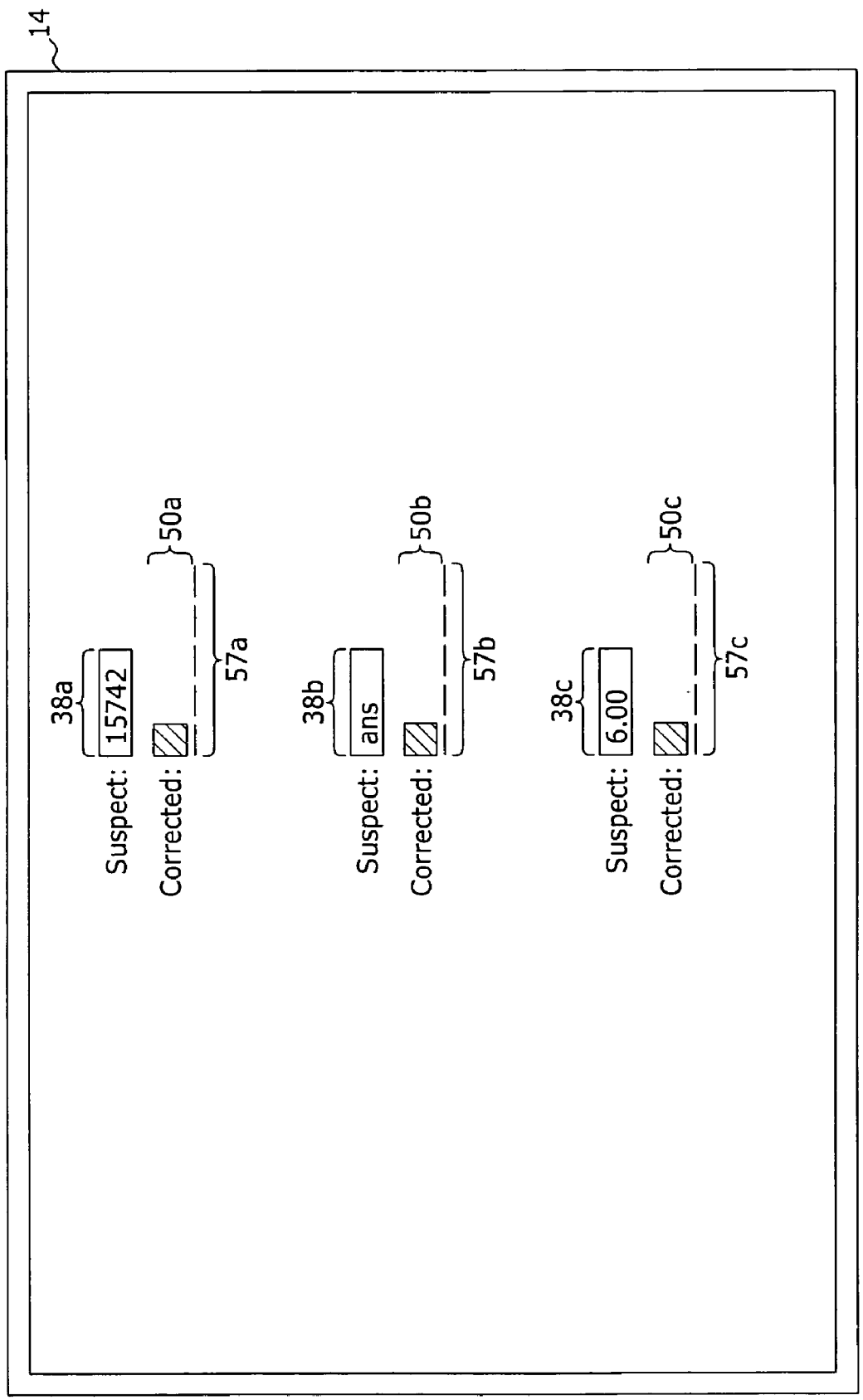
FIG. 8 is a diagram representing a second sub-embodiment of exception handling in accordance with the present invention.

Turning briefly to FIG. 8 a second embodiment of operation wherein the back end exception handling server 28 generates multiple exception handling images 38a-38c, each representing one of multiple exception data field values is shown.

Each exception handling image 38a-38c is generated by distinguishing the exception portions 39a-39c (shown in FIG. 7) of the document image 17 from the redacted portion 40.

Returning to FIG. 6, each exception portion 39a-39c whether within a single exception image 38 or within multiple exception images 38a-38c may be referred to as an image fragment.

Step 121 represents the back end exception handling server 28 associating each image fragment with a fragment ID value 35 and the document identifier 34 from which the fragment obtained.

Figures 9, 10:
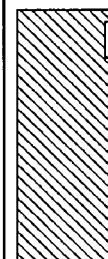
FIG. 9 is a table representing certain associations of information useful in the practice of the first sub-embodiment of exception handling in accordance with the present invention.
FIG. 10 is a table representing certain associations of information useful in the practice of the second sub-embodiment of exception handling in accordance with the present invention.

Turning to FIG. 9, in the first embodiment of the present invention, the exception image 38 is associated with the document identifier 34 and each exception portion 39a-39c is associated with a fragment ID value 35.

Turning to FIG. 10, in the second embodiment of the present invention, each exception image 38a-38c is associated with the document identifier 34 and a fragment ID value 35.

Returning to FIG. 6, step 122 represents passing the exception handling image 38 along with the document identifier 34 each fragment identifier 35 to the front end exception handling server 30.

The front end exception handling server in turn passes the exception handling image 38 along with the document identifier 34 and each fragment identifier 35 to two separate exception handling clients as represented by steps 124 and 126.

Referring again to FIG. 7, in one exemplary embodiment, the exception handling image 38 along with the document identifier 34 and/or each fragment identifier 35 is passed two of the exception handling clients 14a and 14b as an HTML web page which further includes code for: i) display of the exception handling image 38 on such client along with display of exception entry fields 57a-57c; and posting of the user entered text 50 back (e.g. replacement characters for the suspect characters) to the front end exception handling server 30 following user entry. The posting of the user entered text 50 is in conjunction with the document ID 34 and/or the fragment ID 35 as represented by steps 128 and 130 of FIG. 6.

Referring again to FIG. 8, in a second embodiment, each exception handling image 38a-38c along with its fragment identifier 35 is passed to two exception handling clients 14a and 14b as an HTML web page which further includes code for: i) display of the exception handling image 38 on such client along with display of exception entry fields 57a-57c; and posting of the user entered text 50 back (e.g. replacement characters for the suspect characters) to the front end exception handling server 30 following user entry. The posting of the user entered text 50 is in conjunction with the fragment ID 35 as represented by steps 128 and 130 of FIG. 6.

It should be appreciated that this second embodiment enables image fragments from a single document to be sent to multiple different exception handling clients 14a-14c (FIG. 1). This can be useful in that if one image fragment contains information that discloses meaning of another image fragment, security can be maintained by implementing measures to assure that those two image fragments are not sent to the same exception handling client. For example, with brief reference to FIG. 10, exception image, or image fragment 38a may be sent to client 14a for handling while exception image, or image fragment 38b may be sent to client 14b and specifically not to client 14a.

Returning to FIG. 6, after receiving the replacement characters 57a-57c, back from each of the exception handling clients 14a and 14b at steps 128 and 130, the front end exception handling server 30, at step 132, verifies, for each image fragment, that the replacement characters provided by the first exception handling client (for example client 14a) matches the replacement characters for the same image fragment provided by a second exception handling client (for example client 14b).

If the two do not match, the image fragment (or the entire exception handling image 38) is again passed to exception handling clients 14a and 14b as a repeat of steps 124, 126, 128, and 130 because, if there is not a match, it is assumed that at least one of the operators erred.

When the two match at step 132, the front end exception handling server returns the replacement characters to the back end exception handling server (step 134) in association with the document identifier 34 and/or fragment identifiers 35 for substitution (at step 136) of the replacement characters for the suspect characters in the data field value of the data structure.

Although the ladder diagram of FIG. 6 represents the front end exception handling server 30 performing the comparison of the replacement characters provided by each of the exception handling clients 14a-14b, such representation is solely for describing an embodiment of the present invention. Those skilled in the art will readily recognize that the comparison could be performed by the back end exception handling server 28 without departing from the spirit of the invention.

It should also be appreciated that the above described use of an HTML document for passing the exception handling image 38 (or images 38a-38c) along with the document identifier 34 and/or each fragment identifier 35 to the exception handling clients 14a and 14b is also solely for purposes of describing an embodiment of the present invention. Those skilled in the art will readily recognize that such information components may be transferred in any other data and a proprietary software application (e.g. a fat client) operating on clients 14a-14b manage the display of the exception handling image 38 and operation as described herein.

In summary, the present invention provides for a secure document data capture system. Although the invention has been shown and described with respect to certain preferred embodiments, it is obvious that equivalents and modifications will occur to others skilled in the art upon the reading and understanding of the specification. It is envisioned that after reading and understanding the present invention those skilled in the art may envision other processing states, events, and processing steps to further the objectives of the present invention. The present invention includes all such equivalents and modifications, and is limited only by the scope of the following claims.

What is claimed is:

1. A secure document data capture system for generating a data structure, comprising a data field value associated with each of a plurality of identified data fields, from a document image comprising text representing each of such data field values, the secure document data capture system comprising:
a character recognition system receiving the document image and recognizing characters within the text to generate, for each of the identified data fields, a data field value for association therewith;
a validation engine for identifying a subset of the identified data fields, the subset of the identified data fields being those data fields with which its associated data field value includes at least one suspect character, a suspect character being a character which fails to comply with a validation rule thereby indicating that that character recognition system erred in recognizing such character;
an exception handling system:
providing an exception image to a first client system, the exception image comprising a portion of the document image which includes text of the at least one suspect character with a context portion of the document image redacted, the context portion of the document image being a portion of the document image which comprises text which discloses a meaning of the at least one suspect character; and
receiving from the first client system, user input of a replacement character for each suspect character; and
the secure data capture system generating the data structure utilizing, for each identified data field, the data field values generated by the character recognition system with substitution of the replacement character from the exception handling system for each suspect character.

2. The secure document data capture system of claim 1, wherein:
the exception handling system further:
provides the exception image to a second client system;
receives from the second client system, user input of a replacement character for each suspect character; and
the secure data capture system substitutes the replacement character from the exception handling system for each suspect character only when the replacement character form the first client system and the replacement character from the second client system are the same.

3. A secure document data capture system for generating a data structure, comprising a data field value associated with each of a plurality of identified data fields, from a document image comprising text representing each of such data field values, the secure document data capture system comprising:
a character recognition system receiving the document image and recognizing characters within the text to generate, for each of the identified data fields, a data field value for association therewith;
a validation engine for identifying a subset of the identified data fields, the subset of the identified data fields being those data fields with which its associated data field value includes at least one suspect character, a suspect character being a character which fails to comply with a validation rule thereby indicating that that character recognition system erred in recognizing such character;
an exception handling system:
distinguishing an exception portion of the document image from a redacted portion of the document image, the exception portion of the document image being a portion of the document image including the text of the at least suspect characters of a data field value and the redacted portion of the document image being a portion of the document image which comprises text which discloses the meaning of the data field value;
providing an exception image to a first client system, the exception image comprising only the exception portion of the document image; and
receiving from the first client system, user input of a replacement character for each suspect character; and
the secure data capture system generating the data structure utilizing, for each identified data field, the data field values generated by the character recognition system with substitution of the replacement character from the exception handling system for each suspect character.

4. The secure document data capture system of claim 3, wherein:
the exception handling system further:
provides the exception image to a second client system;
receives from the second client system, user input of a replacement character for each suspect character; and
the secure data capture system substitutes the replacement character from the exception handling system for each suspect character only when the replacement character form the first client system and the replacement character from the second client system are the same.

5. A secure document data capture system for generating a data structure, comprising a data field value associated with each of a plurality of identified data fields, from a document image comprising text representing each of such data field values, the secure document data capture system comprising:
a character recognition system receiving the document image and recognizing characters within the text to generate, for each of the identified data fields, a data field value for association therewith;
a validation engine for identifying suspect characters, each suspect character being a character which fails to comply with a validation rule thereby indicating that that character recognition system erred in recognizing such character;
an exception handling system:
providing an exception image to a first client system, the exception image comprising a portion of the document image which includes text of a suspect character with a context portion of the document image redacted, the context portion of the document image being a portion of the document image which comprises text which discloses a meaning of the suspect character; and
receiving from the first client system, user input of a replacement character for the suspect character; and
the secure data capture system generating the data structure utilizing, for each identified data field, the data field values generated by the character recognition system with substitution of the replacement character from the exception handling system for each suspect character.

6. The secure document data capture system of claim 5, wherein:
the exception handling system further:
provides the exception image to a second client system;
receives from the second client system, user input of a replacement character for the suspect character; and
the secure data capture system substitutes the replacement character from the exception handling system for each suspect character only when the replacement character form the first client system and the replacement character from the second client system are the same.

7. A secure document data capture system for generating a data structure, comprising a data field value associated with each of a plurality of identified data fields, from a document image comprising text representing each of such data field values, the secure document data capture system comprising:
a character recognition system receiving the document image and recognizing characters within the text to generate, for each of the identified data fields, a data field value for association therewith;
a validation engine for identifying suspect characters, each suspect character being a character which fails to comply with a validation rule thereby indicating that that character recognition system erred in recognizing such character;
an exception handling system:
distinguishing an exception portion of the document image from a redacted portion of the document image, the exception portion of the document image being a portion of the document image including the text of the suspect character and the redacted portion of the document image being a portion of the document image which comprises text which discloses the meaning of the suspect character;
providing an exception image to a first client system, the exception image comprising only the exception portion of the document image; and
receiving from the first client system, user input of a replacement character for each suspect character; and
the secure data capture system generating the data structure utilizing, for each identified data field, the data field values generated by the character recognition system with substitution of the replacement character from the exception handling system for each suspect character.

8. The secure document data capture system of claim 7, wherein:
the exception handling system further:
provides the exception image to a second client system;
receives from the second client system, user input of a replacement character for the suspect character; and
the secure data capture system substitutes the replacement character from the exception handling system for each suspect character only when the replacement character from the first client system and the replacement character from the second client system are the same.

9. A secure document data capture system for generating a data structure, comprising a data field value associated with each of a plurality of identified data fields, from a document image comprising text representing each of such data field values, the secure document data capture system comprising:
a character recognition system receiving the document image and recognizing characters within the text to generate, for each of the identified data fields, a data field value for association therewith;
a validation engine for identifying a subset of the identified data fields, the subset of the identified data fields being those data fields with which its associated data field value includes at least one suspect character, a suspect character being a character which fails to comply with a validation rule thereby indicating that that character recognition erred in recognizing such character;
an exception handling system:
providing a first exception image to a first client system, the exception image comprising a portion of the document image which includes text of the at least one suspect character of only a first identified data field with a context portion of the document image redacted, the context portion of the document image being a portion of the document image which comprises text which discloses a meaning of the at least one suspect character;
receiving from the first client system, user input of a replacement character for each suspect character;
providing a second exception image to a second client system, the exception image comprising a portion of the document image which includes text of the at least one suspect character of only a second identified data field with a context portion of the document image redacted, the context portion of the document image being a portion of the document image which comprises text which discloses a meaning of the at least one suspect character;

receiving from the second client system, user input of a replacement character for each suspect character;

the secure data capture system generating the data structure utilizing, for each identified data field, the data field values generated by the character recognition system with substitution of the replacement character from the exception handling system for each suspect character.

* * * * *